US010600001B2

(12) United States Patent
Ponnuswamy

(10) Patent No.: US 10,600,001 B2
(45) Date of Patent: Mar. 24, 2020

(54) DETERMINING A TARGET DEVICE PROFILE INCLUDING AN EXPECTED BEHAVIOR FOR A TARGET DEVICE

(71) Applicant: Facebook, Inc., Menlo Park, CA (US)

(72) Inventor: Subbu Ponnuswamy, Saratoga, CA (US)

(73) Assignee: Facebook, Inc., Menlo Park, CA (US)

( * ) Notice: Subject to any disclaimer, the term of this patent is extended or adjusted under 35 U.S.C. 154(b) by 282 days.

(21) Appl. No.: 15/428,470

(22) Filed: Feb. 9, 2017

(65) Prior Publication Data

US 2018/0225592 A1 Aug. 9, 2018

(51) Int. Cl.
*G06F 16/00* (2019.01)
*G06N 20/00* (2019.01)
*G06F 16/35* (2019.01)

(52) U.S. Cl.
CPC ............ *G06N 20/00* (2019.01); *G06F 16/35* (2019.01)

(58) Field of Classification Search
CPC ............ H04L 63/1416; H04L 63/1441; H04L 63/1425; H04L 12/2803; H04L 2012/2841; H04L 63/1408; H04L 63/1433; H04L 2012/5609; H04L 2012/5623; H04L 29/06585; H04L 41/0853; H04L 41/0866; H04L 41/12; H04L 43/0876; H04L 43/12; H04L 45/02; H04L 63/10; H04L 63/101; H04L 63/102; H04L 63/1466; H04L 41/0631; H04L 43/065; H04L 43/0823; H04L 63/0227; H04L 63/1458; H04L 51/02; H04L 63/20; H04L 67/02; H04L 67/327; G06F 21/552; G06F 11/0709; G06F 11/0784; G06F 11/079; G06F 11/30; G06F 1/26; G06F 21/577; G06F 21/554; G06F 16/2282; G06F 16/25; G06F 16/282
See application file for complete search history.

(56) References Cited

U.S. PATENT DOCUMENTS

| | | | |
|---|---|---|---|
| 9,213,590 B2 | 12/2015 | Lakshmanan et al. | |
| 2010/0010944 A1* | 1/2010 | Cheng | G06Q 10/06 706/12 |
| 2011/0044182 A1* | 2/2011 | Herriott | H04L 43/065 370/252 |
| 2012/0191826 A1* | 7/2012 | Gotesdyner | H04L 12/6418 709/221 |

(Continued)

*Primary Examiner* — Yicun Li

(57) ABSTRACT

Techniques for obtaining a target device profile included an expected behavior for a target device are disclosed. An unsupervised learning algorithm is applied to a global dataset including device data corresponding to multiple device types. Additionally, the unsupervised learning algorithm is applied to a device type dataset including device data corresponding to a single device type. Clusters are obtained from both the global dataset and the device type dataset. Clusters that share a device attribute with a target device are identified as "relevant clusters." Behaviors associated with the relevant clusters are used to determine expected behaviors for the target device. Values, for a particular behavior that is common to multiple relevant clusters, are merged to determine an expected value, for the particular behavior, for the target device. Additionally or alternatively, the behaviors, associated with the relevant clusters, are aggregated to form the target device profile.

20 Claims, 8 Drawing Sheets

(56) References Cited

U.S. PATENT DOCUMENTS

2013/0298235 A1   11/2013  Smith
2015/0163121 A1*  6/2015   Mahaffey ............ G06F 11/0766
                                                       707/687
2017/0359219 A1   12/2017  Berglund et al.
2018/0189667 A1*  7/2018   Tsou .................... G06N 5/003

* cited by examiner

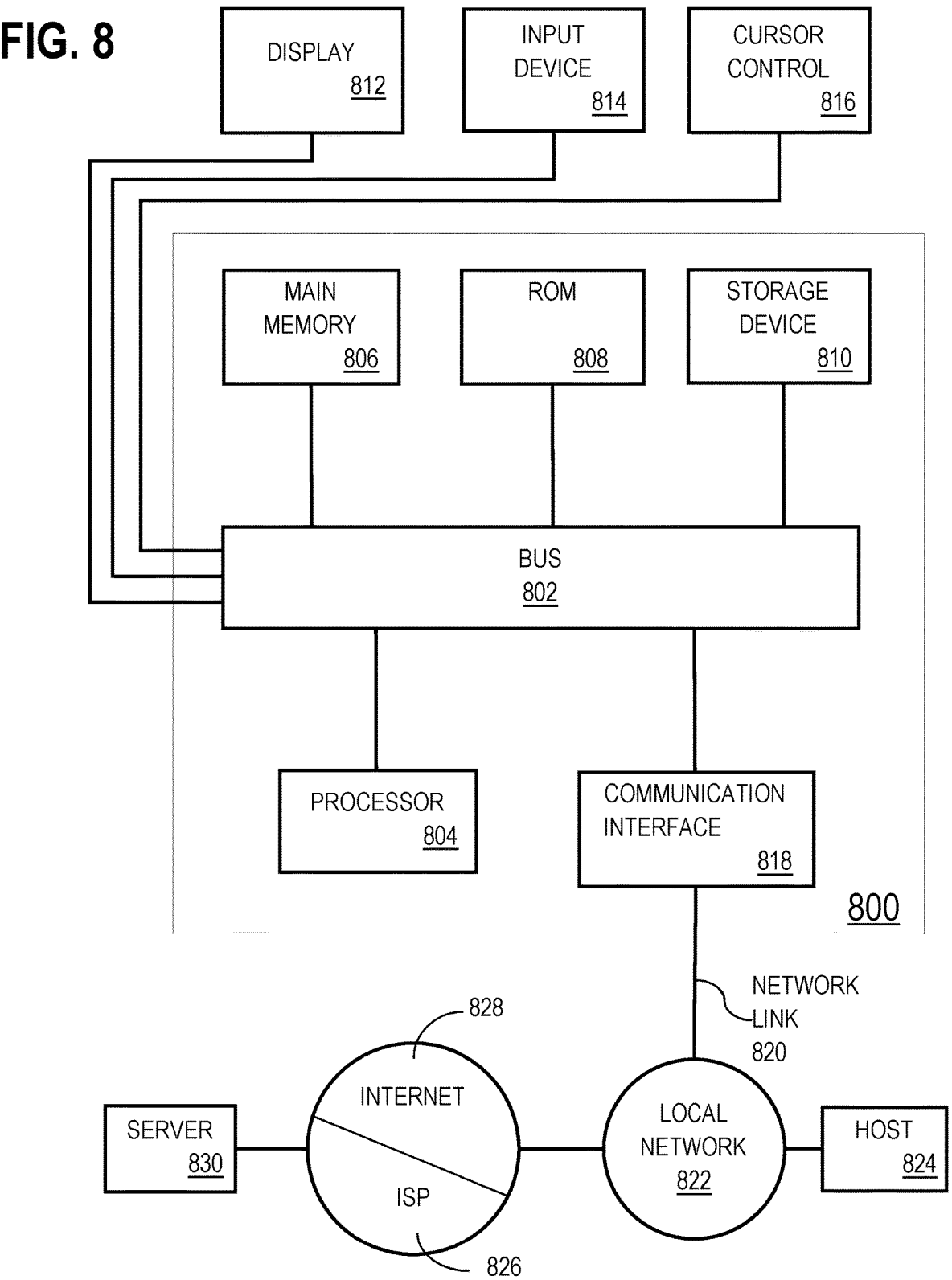

DETERMINING A TARGET DEVICE PROFILE INCLUDING AN EXPECTED BEHAVIOR FOR A TARGET DEVICE

RELATED APPLICATIONS; INCORPORATION BY REFERENCE

This application is related to U.S. patent application Ser. No. 15/428,404, filed Feb. 9, 2017, where is hereby incorporated by reference in its entirety.

TECHNICAL FIELD

The present disclosure relates to network communications. In particular, the present disclosure relates to determining a target device profile including an expected behavior for a target device.

BACKGROUND

A communication network provides communication links among a set of nodes. Examples of communication networks include the Internet, an intranet, a public network, a private network, a wide area network, a local area network, an ad hoc network, mesh network, a peer-to-peer network, a distributed network, and an Internet of Things (IoT) network. The communication links may be implemented using a variety of wireless and/or wired communication technologies. Transmission media include but are not limited to electrical cables, coaxial cables, twisted pair wires, optical fibers, radio waves, and/or microwaves. Embodiments and examples described in this patent application may be used in one or more types of communications networks.

In recent years, Wireless Local Area Network (WLAN) technologies have emerged as a fast-growing market. Among the various WLAN technologies, the Institute of Electrical and Electronics Engineers (IEEE) 802.11 standard is the dominating technology and is frequently used for WLANs. The IEEE 802.11 standard includes operations in one or more bands (such as the 2.400-2.500 GHz band and/or the 4.915-5.825 GHz band), and multiple channels within each band. Wi-Fi is an example of a communication technology based on the IEEE 802.11 standard. Other examples of wireless communications technologies include WiGig, Zigbee, and Bluetooth.

Nodes in a communications network include client devices and network devices. A network device is configured to provide, control, facilitate and/or manage the communication links in the communications network. A network device may provide a communication link between a client device and a communications network. The network device and/or client device may initiate the establishment of the communication link. As an example, the client device may transmit a request to connect to the communication network. As another example, the network device may transmit a broadcast message to the client device, even if the client device had not requested access to the communications network. Examples of network devices include an access point (AP), a cable modem, a cellular tower, a router, a switch, and a bridge. An AP that communicates wirelessly with client devices may be referred to as a "wireless AP."

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 8 shows a block diagram that illustrates a computer system in accordance with one or more embodiments.

DETAILED DESCRIPTION

Figure 1:
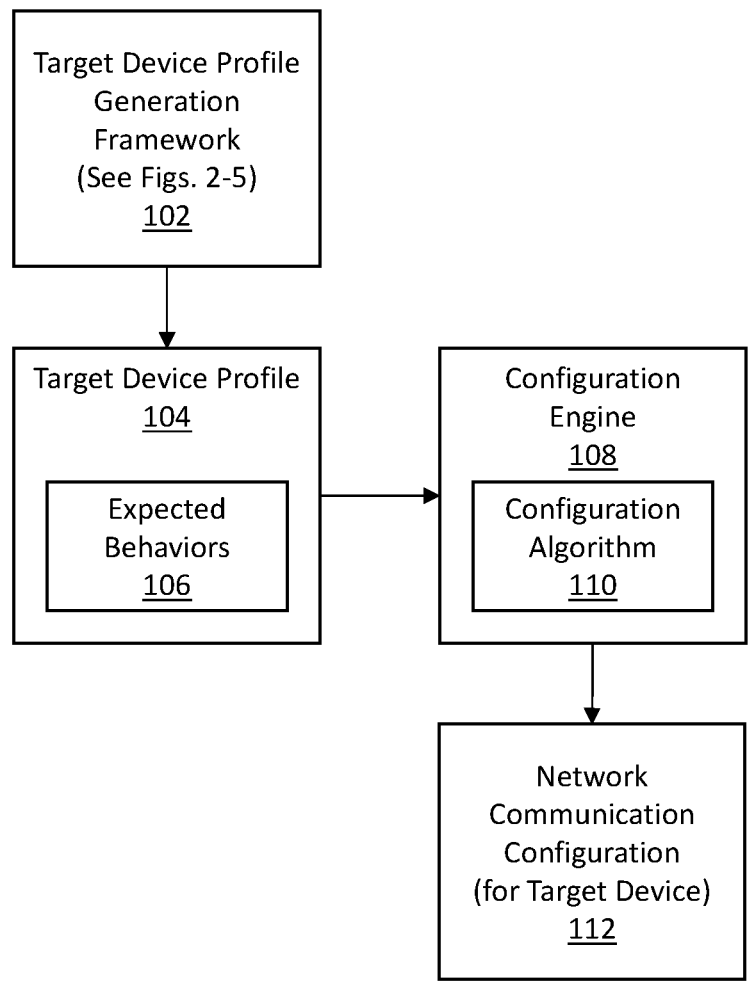
FIG. 1 illustrates an example of a system for determining a network communication configuration for a target device based on a target device profile, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. PROFILE GENERATION SYSTEM ARCHITECTURE
3. OBTAINING A TARGET DEVICE PROFILE
4. MERGING DIFFERENT VALUES, FOR A PARTICULAR BEHAVIOR, TO DETERMINE AN EXPECTED VALUE, FOR THE PARTICULAR BEHAVIOR, FOR A TARGET DEVICE
5. EXAMPLE EMBODIMENT
6. MISCELLANEOUS; EXTENSIONS
7. HARDWARE OVERVIEW

1. General Overview

One or more embodiments include determining a target device profile including an expected behavior for a target device. The target device profile is determined by applying an unsupervised machine learning algorithm to different datasets. First, a global dataset includes multiple sets of device data, each set of device data including device attributes and behaviors corresponding to a different client device. The unsupervised machine learning algorithm is applied to the global dataset to determine clusters within the global dataset. Second, the global dataset is divided into multiple device type datasets, based on the device type associated with each set of device data. The global dataset may be divided into the device type datasets using a classifier function determined via a supervised machine learning algorithm. After dividing the global dataset into device type datasets, the unsupervised machine learning algorithm is applied to each device type dataset to determine clusters within each device type dataset.

Each cluster, obtained from the global dataset or a device type dataset, indicates a correlation between (a) a set of device attributes and (b) a set of behaviors. Each cluster indicates a particular value for a particular behavior. As an example, a particular cluster may indicate a correlation between (a) the attribute "Channel 36 (at 40 MHz width)" and (b) a value of 30 ms" for the behavior "connection time." Another cluster may indicate a correlation between (a) the attributes "iPhone 7" and "aggregation size of 2" and (b) a value of "−70 dBm" for the behavior "signal-to-noise threshold for roaming."

Clusters that share a device attribute with a target device are identified as "relevant clusters." Behaviors associated with the relevant clusters are used to determine expected behaviors for the target device. The method used for determining an expected behavior for the target device depends on whether the behavior is common to multiple relevant clusters or is unique to a single relevant cluster.

A particular behavior that is common to multiple relevant clusters is identified. The values, for the particular behavior, indicated by each such relevant cluster are identified. A weight, corresponding to each value, is determined. The weight is determined based on various factors, such as:
  (a) an attribute type of the attribute that is shared between a particular relevant cluster and the target device;
  (b) a behavior type of the common behavior shared across the relevant clusters;
  (c) a number of device attributes that are shared between a particular relevant cluster and the target device;
  (d) a number of devices in a particular relevant cluster;
  (e) a particular time period in which the device data corresponding to a particular relevant cluster was collected; and
  (f) a correlation strength between the attributes and the behaviors associated with a particular relevant cluster.

A weighted average of the values, for the particular behavior, is computed. The weighted average is determined as the expected value, for the particular behavior, for the target device. The expected value for the particular behavior is included in the target device profile.

Additionally or alternatively, each behavior that is unique to a single relevant cluster is identified. The behaviors, indicated by the relevant clusters, are determined as expected behaviors for the target device. The behaviors are aggregated into the target device profile.

One or more embodiments described in this Specification and/or recited in the claims may not be included in this General Overview section.

2. Profile Generation System Architecture

FIG. 1 illustrates an example of a system for determining a network communication configuration for a target device based on a target device profile, in accordance with one or more embodiments. FIG. 1 includes a target device profile generation framework 102, a target device profile 104, a configuration engine 108, and a network communication configuration 112 for a target device. In one or more embodiments, the system for determining a network communication configuration for a target device may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Components that are labeled with a same number across FIGS. 1-5 refer to the same component.

In one or more embodiments, a target device profile 104 is a profile for a particular client device (also referred to as a "target device"). A target device profile 104 includes expected behaviors 106 for the target device. The expected behaviors 106 may be determined based on actual behaviors of the target device and/or other client devices. Types of behaviors for a client device include but are not limited to:
  (a) protocol behavior;
  (b) connection behavior;
  (c) power-save behavior;
  (d) roaming behavior;
  (e) response to a particular configuration algorithm; and
  (f) response to a particular radio-frequency (RF) environment.

Protocol behavior includes behaviors associated with a network communication protocol. Examples include operations that are performed by the target device to associate with an AP; the sequence of the operations that are performed by the target device to associate with an AP; the duration of time used in completing each operation performed by the target device to associate with an AP; the type and/or size of frame aggregation used by the target device; the frequency at which the target device performs scanning; and the triggers that cause the target device to perform scanning.

Connection behavior includes behaviors associated with associating with an AP. Examples include what band the target device uses to connect with an AP; what conditions cause the target device to connect using a particular band rather than another band; the duration of time used by the target device to find available APs; and the duration of time used by the target device to determine which AP to connect with.

Power-save behavior includes behaviors associated with a power-save mode of the target device. Examples include the frequency with which the target device enters power-save mode; the triggers that cause the target device to enter power-save mode; the triggers that cause the target device to exit power-save mode; and any behaviors of the target device while in power-save mode.

Roaming behavior includes behaviors associated with roaming. Examples include the triggers that cause the target device to roam; the duration of time used in roaming from one AP to another AP; the amount of data that is lost during roaming; and the duration of time used in determining whether to roam.

Response to a particular configuration algorithm includes behaviors of the target device in response to a configuration algorithm. As further described below, examples of configuration algorithms include a "intelligent client steering algorithm" and a "sticky client management algorithm." An intelligent client steering algorithm (also referred to as a "steering algorithm") is configured to steer a client device from one radio to another radio if the switch results in a performance improvement that is above a threshold. Various steering methods may be used, such as, transmitting a de-authentication message to the client device; instructing the client device to move to another radio using an 802.11v message; and modifying another protocol message, format, or contents. Examples of responses to a steering algorithm include the duration of time used to connect with the particular AP identified by the steering algorithm; and whether the target device correctly connected to the particular AP identified by the steering algorithm. Examples of responses to a sticky client management algorithm include whether the target device correctly disconnected from an AP as determined by the sticky client management algorithm; and whether the target device successfully connected to another AP after disconnecting from a particular AP, as determined by the sticky client management algorithm.

Response to a particular RF environment includes behaviors of the target device in response to one or more attributes of an RF environment. Attributes of an RF environment include a noise level; an interference level; a number of wireless devices operating within a wireless range of the target device; a number of APs within a wireless range of the target device; and a number of channels utilized by the APs within a wireless range of the target device.

In one or more embodiments, a network communication configuration 112 for a target device specifies one or more settings for the target device, other client devices in the communications network, and/or network devices in the communication network. A network communication configuration 112 may specify different settings for different time periods (such as, time of day and/or day of week).

Examples of settings for a network device (such as an AP) include conditions for accepting or rejection a connection request from the target device; a RF channel utilized by the network device; a transmit power; a Modulation and Coding Scheme (MCS) or a Physical Layer (PHY) rate; a probe response threshold; a disassociate threshold; a receive sensitivity; a receive gain; a transmit cell size; a receive cell size; the operations and sequence thereof for associating with a client device; a threshold time period for performing a particular operation before generating a time-out error.

Examples of settings for a client device (such as the target device) include which AP to attempt a connection with; a RF channel utilized by the client device; a transmit power; a MCS or PHY rate; a signal-strength threshold for roaming; a receive sensitivity; a receive gain; a transmit cell size; a receive cell size; the operations and sequence thereof for associating with a network device; a threshold time period for performing a particular operation before generating a time-out error; a retry rate; and an aggregation size.

A network device and/or a client device is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, a target device profile generation framework 102 is configured to generate a target device profile 104. Components associated with the target device profile generation framework 102 are further described below with reference to FIGS. 2-5. Examples of operations for generating a target device profile 104 are described below with reference to FIGS. 6-7.

In one or more embodiments, a configuration engine 108 is configured to determine a network communication configuration 112 for a target device based on a target device profile 104. The configuration engine 108 determines the network communication configuration 112 by applying one or more configuration algorithms 110 to the target device profile 104. As an example, a target device profile may indicate that a target device is expected to use 20.0 ms to perform a particular association operation under a specific network configuration, RF environment, time-of-day, and/or other conditions. A configuration algorithm may indicate that the maximum time period to wait for completion of the particular association operation is determined by adding 5.0 ms to the expected time period necessary for completing the particular association operation. A configuration engine may apply the configuration algorithm to the expected behavior of the target device. The configuration engine may configure an AP, in the RF environment of the target device, to wait at least 25.0 ms before generating a time-out error during execution of the particular association operation or taking a specific corrective action to recover from or prevent a potential connectivity issue.

A target device profile generation framework 102 and/or a configuration engine 108 may be implemented or executed as part of an Expert system, Rule-Based system, Self-Learning system, or Machine-Learning system, which implements Machine Intelligence or Artificial Intelligence techniques. The target device profile generation framework 102 and/or the configuration engine 108 may be executed and/or distributed on one or more network devices that are local to a communication network provided by the network devices. Additionally or alternatively, the target device profile generation framework 102 and/or the configuration engine 108 may be executed and/or distributed on one or more digital devices that are remote from the communication network, such as a controller implemented in a cloud environment.

Figure 2:
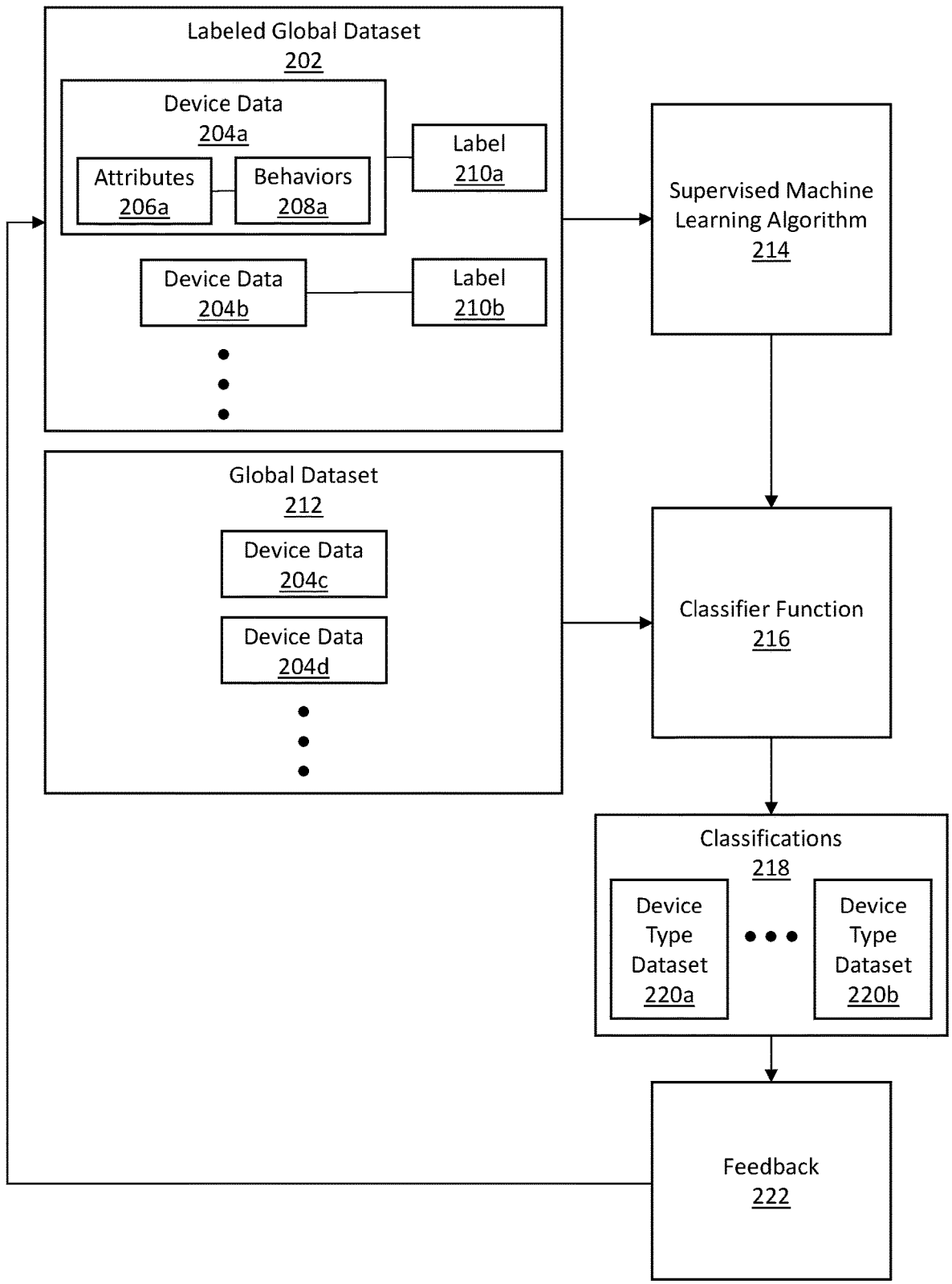
FIG. 2 illustrates an example of a supervised machine learning system for obtaining a target device profile, in accordance with one or more embodiments.

FIG. 2 illustrates an example of a supervised machine learning system for obtaining a target device profile, in accordance with one or more embodiments. FIG. 2 includes a labeled global dataset 202, a new global dataset 212, a supervised machine learning algorithm 214, a classifier function 216, classifications 218, and feedback 222. In one or more embodiments, the supervised machine learning system may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component. Components that are labeled with a same number across FIGS. 1-5 refer to the same component.

In one or more embodiments, a supervised machine learning algorithm 214 (also referred to as a "supervised learning algorithm") is configured to determine a classifier function 216 based on a training dataset. An supervised machine learning algorithm 214 may be implemented using one or more algorithms well-known in the art, such as support vector machine (SVM), neural networks, pattern recognition, and/or Bayesian statistics.

In one or more embodiments, a classifier function 216 determines classifications 218 for one or more sets of device data. A classifier function 216 is applied to a set of device data to determine a particular class, of a candidate set of classes, for the set of device data. Each class includes device data associated with at least one common device attribute. In an embodiment, each class includes device data associated with the same device type. Examples of device types include Apple iPhone 7, Apple iPhone 6, and Samsung Galaxy S6. In other embodiments, each class includes device data associated with another common device attribute, such as the same manufacturer, the same operating channel, and/or the same multiple-input and multiple-output (MIMO) setting. As illustrated, a classifier function 216 divides a global dataset 212 into multiple device type datasets 220a-b.

In one or more embodiments, a global dataset 212 includes multiple sets of device data 204c-d. A particular set of device data (illustrated as device data 204a, device data 204b, device data 204c, or device data 204d) includes attributes and behaviors of a particular client device. For example, device data 204a includes attributes 206a and behaviors 208a of one client device. Device data 204b includes attributes and behaviors of another client device. Device data 204c includes attributes and behaviors of another client device. Device data 204d includes attributes and behaviors of another client device.

Examples of device attributes include a product type of the device (such as, whether the device is a laptop, desktop, or smartphone); a manufacturer of the device; a manufacturing location and/or date of the device; a device type of the device (such as, whether the device is an iPhone 7, iPhone 6, or Samsung Galaxy S6); an operating system and version thereof executing on the device; an application and version thereof executing on the device; an operating channel of the device; a MCS or PHY rate of the device; an aggregation size of the device; a user registered for and/or logged into the device; a geographical location of the device (such as, longitudinal and latitudinal coordinates of the device, or a particular room and/or building at which the device is located); a particular network to which the device is connected; a particular AP, cable modem, and/or cellular tower to which the device is connected; and a time of day at which the device is making a connection.

Examples of behaviors are discussed above with reference to expected behaviors 106 of FIG. 1.

In one or more embodiments, a device type dataset (such as, device type dataset 220a or device type dataset 220b) is a subset of the global dataset 212. A particular device type dataset includes sets of device data associated with the same device type.

In one or more embodiments, feedback 222 includes information indicating an actual classification for each set of device data. Feedback 222 may indicate whether the classifications 218, determined by the classifier function 216, are correct or not. Feedback 222 may be determined based on user input entered via a user interface. Additionally or alternatively, feedback 222 may be determined using another application.

As an example, a classifier function may determine that a particular set of device data corresponds to the device type, Apple iPhone 7. A user may review the particular set of device data and manually determine that the particular set of device data corresponds to Apple iPhone 6. The user may enter feedback via a user interface to indicate that the classification determined by the classifier function is incorrect. The user may enter feedback to indicate that the particular set of device data corresponds to iPhone6.

In one or more embodiments, a labeled global dataset 202 is a training dataset for input into a supervised machine learning algorithm 214. The labeled global dataset 202 includes multiple sets of device data 204a-b, and labels 210a-b corresponding to each set of device data 204a-b. A label, corresponding to a set of device data, indicates an actual classification for the set of device data. The label may be generated based on feedback 222. As illustrated, device data 204a is annotated with label 210a. Device data 204b is annotated with label 210b.

Initially, the labeled global dataset 202 may be a bootstrap dataset that is used to initiate the supervised machine learning system. Subsequently, the labeled global dataset 202 may be expanded and/or modified based on device data collected for client devices in a communication network. The labeled global dataset 202 may be expanded and/or modified, in real-time, using device data collected for devices in a communication network as the device data is being collected.

As an example, initially, a labeled global dataset 202 may be input into a supervised machine learning algorithm 214. The supervised machine learning algorithm may determine a classifier function 216. A global dataset 212 may be newly collected for devices in a communication network. The classifier function 216 may be applied to the global dataset 212 to determine classifications 218. Feedback 222 may be obtained to add labels to the global dataset 212. The global dataset 212, with the added labels, may be added to the labeled global dataset 202. The expanded labeled global dataset 202 may be input into the supervised machine learning algorithm 214. The supervised machine learning algorithm may modify and/or refine the classifier function 216 based on the new device data of the global dataset 212. The labeled global dataset 202 is iteratively expanded and/or modified, such that the accuracy of the classifier function 216 is iteratively improved.

Figure 3:
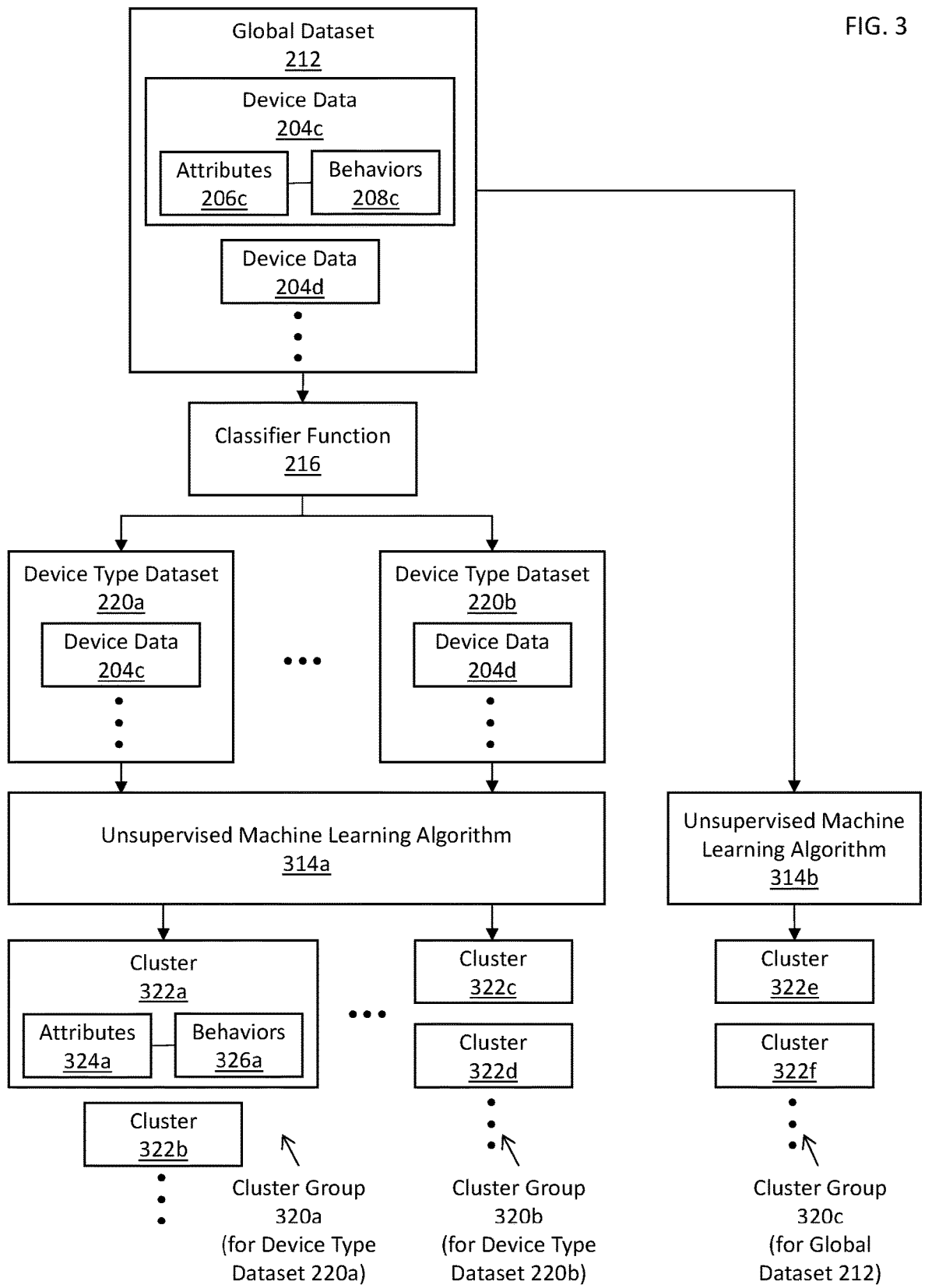
FIG. 3 illustrates an example of an unsupervised machine learning system for obtaining a target device profile, in accordance with one or more embodiments.

FIG. 3 illustrates an example of an unsupervised machine learning system for obtaining a target device profile, in accordance with one or more embodiments. FIG. 3 includes a global dataset 212, a classifier function 216, device type datasets 220a-b, unsupervised machine learning algorithms 314a-b, clusters 322a-f. In one or more embodiments, the unsupervised machine learning system may include more or fewer components than the components illustrated in FIG. 3. The components illustrated in FIG. 3 may be local to or remote from each other. The components illustrated in FIG. 3 may be implemented in software and/or hardware. Each component may be distributed over multiple applications and/or machines. Multiple components may be combined into one application and/or machine. Operations described with respect to one component may instead be performed by another component. Components that are labeled with a same number across FIGS. 1-5 refer to the same component.

As described above with reference to FIG. 2, a global dataset 212 includes multiple sets of device data 204c-d. As illustrated, device data 204c includes attributes 206c and behaviors 208c of one client device. Device data 204d includes attributes and behaviors of another client device.

The global dataset 212 is input into a classifier function 216. The classifier function 216 classifies the sets of device data 204c-d based on a device type. The classifier function 216 divides the global dataset 212 into multiple device type datasets 220a-b. As illustrated, device type dataset 220a includes device data 204c. Device type dataset 220b includes device data 204d.

In one or more embodiments, an unsupervised machine learning algorithm (such as, unsupervised machine learning algorithm 314a or unsupervised machine learning algorithm 314b) is configured to identify one or more clusters 322a-f in a particular dataset. An unsupervised machine learning algorithm (also referred to as an "unsupervised learning algorithm") may be implemented using one or more algorithms well-known in the art, such as clustering, and/or neural networks.

The unsupervised machine learning algorithm 314a is applied to each of the device type datasets 220a. The unsupervised machine learning algorithm 314b is applied to the global dataset 212. The unsupervised machine learning algorithm 314a and the unsupervised machine learning algorithm 314b may be the same as or different from each other.

As illustrated, the application of the unsupervised machine learning algorithm 314a to the device type dataset 220a generates cluster group 320a. Cluster group 320a includes clusters 322a-b. The application of the unsupervised machine learning algorithm 314a to the device type dataset 220b generates cluster group 320b. Cluster group 320b includes clusters 322c-d. The application of the unsupervised machine learning algorithm 314b to the global dataset 212 generates cluster group 320c. Cluster group 320c includes clusters 322e-f.

In one or more embodiments, a cluster (such as, cluster 322a, cluster 322b, cluster 322c, cluster 322d, cluster 322e, or cluster 322f) is group of device data that exhibits a correlation between (a) one or more device attributes and (b) one or more behaviors. As illustrated, the cluster 322a indicates a correlation between attributes 324a and behaviors 326a. The sets of device data in a particular cluster are more similar to each other than to sets of device data in other clusters.

Clusters 320a-f may be stored in one or more data repositories. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as an unsupervised machine learning algorithm 314a, unsupervised machine learning algorithm 314b, and/or profile builder 406 (which is further described with reference to FIG. 4). Alternatively or additionally, a data repository may be implemented or executed on a computing system separate from an unsupervised machine learning algorithm 314a, unsupervised machine learning algorithm 314b, and/or profile builder 406. A data repository may be communicatively coupled to an unsupervised machine learning algorithm 314a, unsupervised machine learning algorithm 314b, and/or profile builder 406 via a direct connection or via a network.

Figure 4:
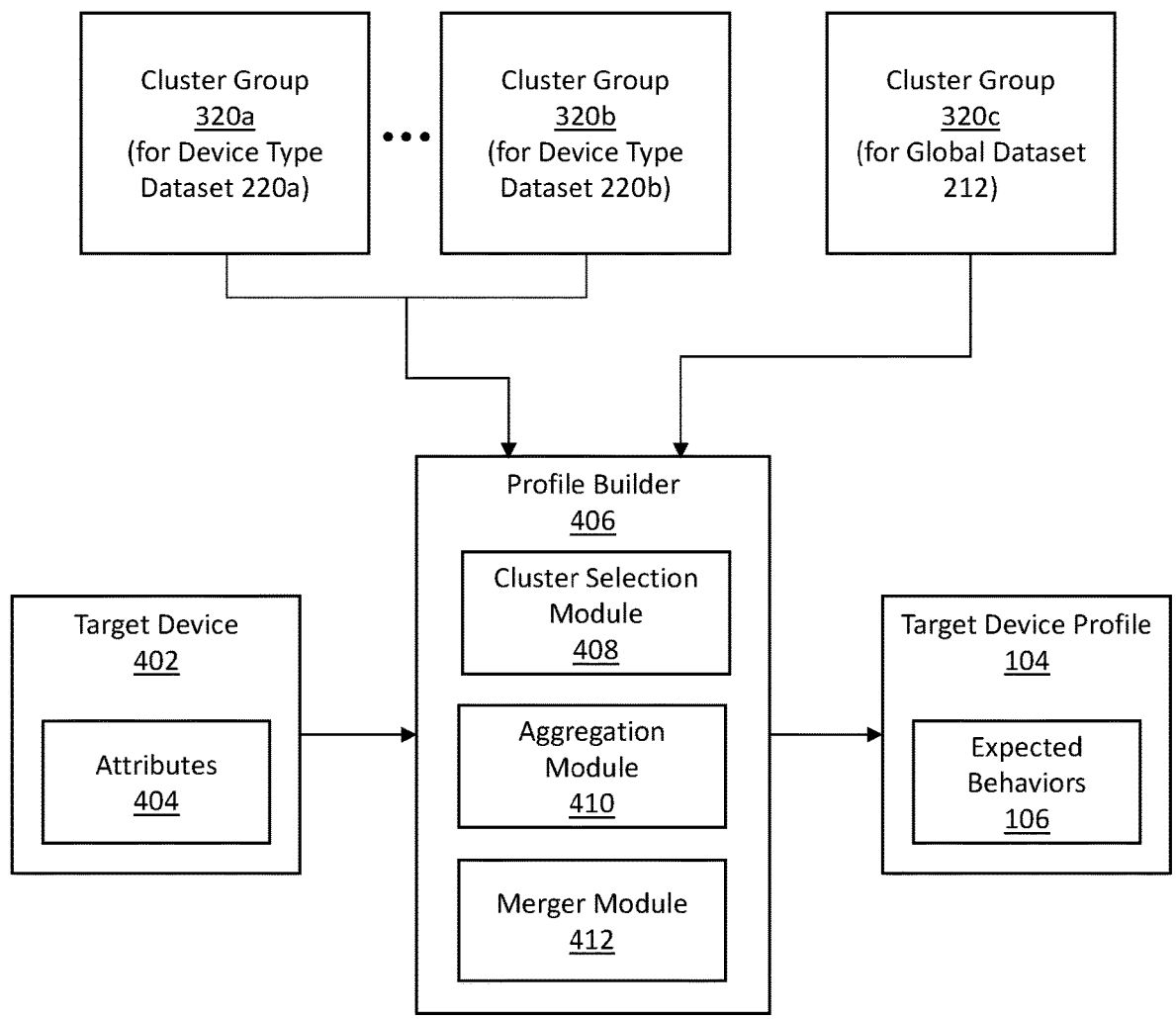
FIG. 4 illustrates an example of a profile building system for obtaining a target device profile, in accordance with one or more embodiments.

FIG. 4 illustrates an example of a profile building system for obtaining a target device profile, in accordance with one or more embodiments. FIG. 4 includes cluster groups 320a-c, a target device 402, a profile builder 406, and a target device profile 104. In one or more embodiments, the profile building system may include more or fewer components than the components illustrated in FIG. 4. The components illustrated in FIG. 4 may be local to or remote from each other. The components illustrated in FIG. 4 may be implemented in software and/or hardware. Each component may be distributed over multiple applications and/or machines. Multiple components may be combined into one application and/or machine. Operations described with respect to one component may instead be performed by another component. Components that are labeled with a same number across FIGS. 1-5 refer to the same component.

As described above, the application of an unsupervised machine learning algorithm to each of a device type dataset as well as a global dataset generates multiple cluster groups 320a-c.

In one or more embodiments, a profile builder 406 refers to hardware and/or software configured to generate a target device profile 104, for a target device 402, using one or more clusters within cluster groups 320a-c. The profile builder 406 generates the target device profile 104, including the expected behaviors 106 of the target device 402, based on attributes 404 of the target device 402. Examples of attributes 404 of a target device 402 are described above with reference to the device attributes (such as attributes 206a) illustrated in FIG. 2. Examples of expected behaviors 106 of a target device 402 are described above with reference to FIG. 1. The profile builder 406 includes a cluster selection module 408, an aggregation module 410, and/or a merger module 412.

The cluster selection module 408 is configured to select clusters relevant to the target device 402 based on attributes 404. The cluster selection module 408 may select the relevant clusters in two phases. In the first phase, the cluster selection module 408 selects cluster groups 320a-c that are relevant to the target device 402. In the second phase, the cluster selection module 408 selects clusters, within each selected cluster group, that are relevant to the target device 402. Examples of operations for selecting relevant clusters are described below with reference to FIG. 6.

The aggregation module 410 is configured to aggregate different behaviors associated with multiple relevant clusters to form a target device profile 104. As an example, attributes of a target device may include both an operating channel of 36 (at 40 MHz width) and a signal-to-noise ratio (SNR) of 20 dB. A first relevant cluster may indicate a correlation between (a) an operating channel of 36 (at 40 MHz width) and (b) a connection time of 30 ms. A second relevant cluster may indicate a correlation between (a) an SNR of 20 dB and (b) a roaming time of 40 ms. Since the first relevant cluster and the target device share a device attribute (that is, operating channel of 36), an aggregation module may include the behavior of the first relevant cluster (that is, connection time of 30 ms) into the target device profile. Since the second relevant cluster and the target device share a device attribute (that is, SNR of 20 dB), the aggregation module may include the behavior of the second relevant cluster (that is, the roaming time of 40 ms) into the target device profile. Hence, the aggregation module aggregates the behaviors of multiple relevant clusters to obtain the expected behaviors of the target device. The expected behaviors of the target device include: a connection time of 30 ms and a roaming time of 40 ms. Examples of operations for aggregating behaviors are described below with reference to FIG. 6.

The merger module 412 is configured to merge conflicting values, for the same behavior, associated with multiple relevant clusters to form a target device profile 104. As an example, attributes of a target device may include both an operating channel of 36 (at 40 MHz width) and an SNR of 20 dB. A first relevant cluster may indicate a correlation between (a) an operating channel of 36 (at 40 MHz width) and (b) a connection time of 30 ms. A second relevant cluster may indicate a correlation between (a) an SNR of 20 dB and (b) a connection time of 45 ms. Each of the first relevant cluster and the second relevant cluster share a device attribute with the target device. However, the first relevant cluster and the second relevant cluster are associated with different values for the same behavior (that is, the connection time). A merger module may determine a weighted average of the different values for the connection time in order to determine an expected value for the connection time for the target device. Examples of operations for merging values, for the same behavior, are described below with reference to FIGS. 6-7.

Figure 5:
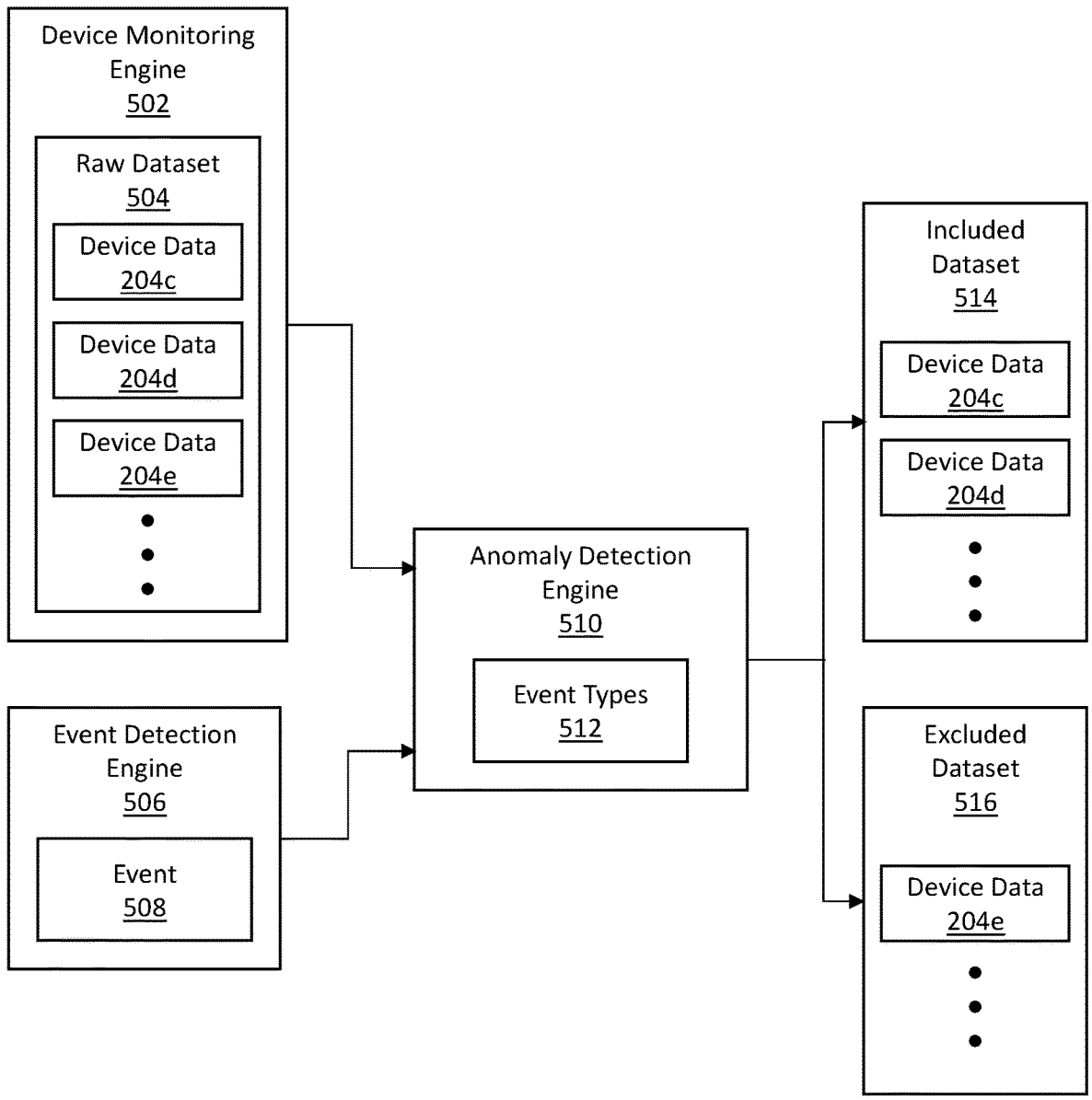
FIG. 5 illustrates an example of an anomaly detection system for obtaining a target device profile, in accordance with one or more embodiments.

FIG. 5 illustrates an example of an anomaly detection system for obtaining a target device profile, in accordance with one or more embodiments. FIG. 5 includes a device monitoring engine 502, an event detection engine 506, an anomaly detection engine 510, an included dataset 514, and an excluded dataset 516. In one or more embodiments, the anomaly detection system may include more or fewer components than the components illustrated in FIG. 5. The components illustrated in FIG. 5 may be local to or remote from each other. The components illustrated in FIG. 5 may be implemented in software and/or hardware. Each component may be distributed over multiple applications and/or machines. Multiple components may be combined into one application and/or machine. Operations described with respect to one component may instead be performed by another component. Components that are labeled with a same number across FIGS. 1-5 refer to the same component.

In one or more embodiments, a device monitoring engine 502 is configured to monitor and collect device data 204c-e for one or more devices in a communication network. The collected device data 204c-e may be referred to as a "raw dataset 504." In an embodiment, the device monitoring engine 502 is implemented on one or more APs and/or other network devices. As an example, a set of APs may monitor client devices in an RF environment. The APs may collect information about the attributes and behaviors of each client device. The APs may store the attributes and behaviors of each client device as a separate set of device data.

In an embodiment, device data 204c-e within the raw dataset 504 may indicate a change in network communication behavior of one or more client devices in the communication network. A change in behavior refers to a change in value for a particular behavior, exhibited by a particular client device, that is greater than a threshold.

As an example, a device monitoring engine may monitor the connection time of a particular client device. Based on past device data for the particular client device, the average connection time may be 30 ms. However, the device monitoring engine may determine that the connection time of the particular client device is currently 50 ms. The change in value, between the historical average connection time and the current connection time, may be 20 ms. The change in value of 20 ms may be greater than a threshold. Hence, in this example, the device data for the particular client device indicates a change in behavior for the particular client device.

In one or more embodiments, an event detection engine 506 is configured to detect an occurrence of an event 508 that may have caused a change in network communication behavior of a particular client device. The event detection engine 506 may monitor events related to client devices and/or events related to a communications network.

Examples of events related to a client device include a change (such as, an update) in an operating system and/or application executing on the client device; a physical shutdown of the client device; a manual reset of the client device; a change in the user of the client device.

Examples of events related to a communications network include events related to an RF environment. Examples of events related to a communication network include a change in the deployment of network devices in the RF environment (such as the number of network devices, and/or the locations of network devices); a change in the configurations of network devices; a change in the noise level; a change in the interference level; and a change in the physical layout of the RF environment (such as, an additional table in the RF environment, and/or a removal of a particular wall in the RF environment).

In one or more embodiments, an anomaly detection engine 510 is configured to determine whether a change in behavior, as indicated by the device data for a particular client device, is (a) a permanent change in the network communication behavior or (b) an anomaly. In the event that the change in behavior is an anomaly, then the original behavior of the particular client device is expected to resume after a temporary time period.

A data repository associated with the anomaly detection engine 510 stores a candidate set of event types 512. If the event detection engine 506 detects an event 508 that may have caused a change in behavior, as indicated by a particular set of device data, then the anomaly detection engine 510 determines an event type 512 of the event 508. Based on the event type 512 of the event 508, the anomaly detection engine 510 determines whether to classify the particular set of device data into the included dataset 514 or the excluded dataset 516. In some embodiments, the event detection engine 506 detects a combination and/or sequence of events 508 that may have caused a change in behavior, as indicated by a particular set of device data. The anomaly detection engine 510 determines one or more event types 512 of the events. Based on the event types 512, the anomaly detection engine 510 determines whether to classify the particular set of device data into the included dataset 514 or the excluded dataset 516. Additionally or alternatively, the anomaly detection engine 510 classifies the particular set of device data into the included dataset 514 or the excluded dataset 516 based on other factors. Further examples of operations for determining whether to include or exclude device data for determining a network communication configuration for a target device, are described in the related U.S. patent application Ser. No. 15/428,404, filed Feb. 9, 2017, which is hereby incorporated by reference in its entirety In one or more embodiments, an included dataset 514 is a subset of the raw dataset 504 that is used to determine a network communication configuration 112 of a target device. The included dataset 514 may but does not necessarily include a set of device data corresponding to the target device itself. The included dataset 514 may be used to determine a network communication configuration 112 via various methods. In an embodiment, the included dataset 514 is used as the global dataset 212 illustrated in FIGS. 2-3. The included dataset 514 is used to determine the clusters 322a-f, which are used to determine a target device profile 104 for a target device. In other embodiments, the included dataset 514 is used to directly as input into the configuration engine 108 illustrated in FIG. 1.

In one or more embodiments, an excluded dataset 516 is a subset of the raw dataset 504 that is not used to determine a network communication configuration 112 of a target device. The excluded dataset 516 is not included in the global dataset 212.

As illustrated, for example, the raw dataset 504 includes device data 204*c*, device data 204*d*, and device data 204*e*. Based on determinations made by the anomaly detection engine 510, the included dataset 514 includes device data 204*c* and device data 204*d*. The excluded dataset 516 includes device data 204*e*.

3. Obtaining a Target Device Profile

Figure 6:
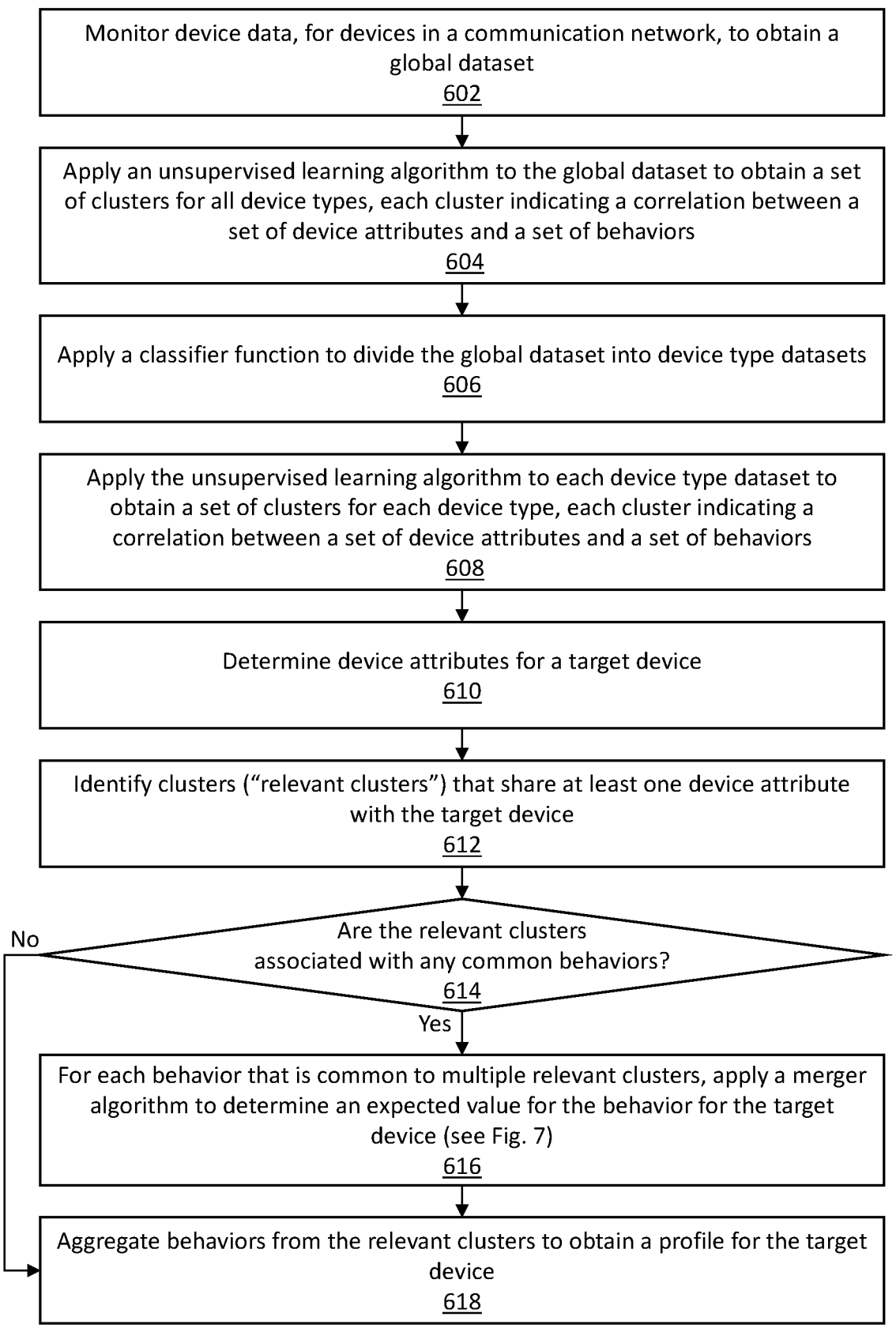
FIG. 6 illustrates an example set of operations for obtaining a target device profile, in accordance with one or more embodiments.

FIG. 6 illustrates an example set of operations for obtaining a target device profile, in accordance with one or more embodiments. Obtaining a target device profile includes: (a) identifying correlations between device attributes and behaviors based on analysis of a global dataset; (b) identifying correlations between device attributes and behaviors based on analysis of device type datasets; and (c) determining expected behaviors for a target device based on the global dataset and the device type datasets. One or more operations illustrated in FIG. 6 may be modified, rearranged, or omitted all together. Accordingly, the particular sequence of operations illustrated in FIG. 6 should not be construed as limiting the scope of one or more embodiments.

One or more embodiments include monitoring device data, for devices in a communication network, to obtain a global dataset (Operation 602). A device monitoring engine 502 monitors device data for devices in a communication network. The device monitoring engine 502 may but is not necessarily executed on a network device (such as, an AP). The devices being monitored may but are not necessarily associated with the network device executing the device monitoring engine 502.

The device monitoring engine 502 collects information regarding the device attributes of each device. As an example, a device monitoring engine may intercept data being transmitted from a particular device. The transmitted data may include a media access control (MAC) address of the particular device, for example, 00-CD-FE-C4-12-34. The IEEE may maintain a registry of manufacturers and corresponding blocks of MAC addresses. The block of MAC addresses beginning with the prefix 00-CD-FE may be assigned to Apple, Inc. Since the MAC address of the particular device is within the block of MAC addresses assigned to Apple, Inc., the device monitoring engine may determine that the manufacturer of the particular device is Apple, Inc. The device monitoring device may store "Apple, Inc." as a device attribute of the particular device. Additionally or alternatively, the device monitoring engine may identify a specific device type of the particular device. Various methods may be used for identifying the device type, such as Dynamic Host Configuration Protocol (DHCP) fingerprinting, Bonjour/mDNS detection or snooping other protocols (such as network discovery, advertisement or management traffic). The device monitoring engine may determine that the particular device is, for example, an iPhone 6s. The device monitoring device may store "iPhone 6s" as a device attribute of the particular device.

As another example, a device monitoring engine may intercept data being transmitted from a particular device. The device monitoring engine may determine that the data is transmitted via channel 11 of the 2.4 GHz band under the IEEE 802.11b/g/n standard. The device monitoring engine may store "channel 11" as a device attribute of the particular device.

As another example, a device monitoring engine may query a particular device for the location of the particular device. Based on a global positioning system (GPS) coupled to the particular device, the particular device may determine that the longitudinal-latitudinal coordinates are 37.77 degrees North and 122.42 degrees East. The particular device may transmit a response to the device monitoring, indicating that the location of the particular device is 37.77 degrees North and 122.42 degrees East. The device monitoring engine may store "37.77 degrees North and 122.42 degrees East" as a device attribute of the particular device.

As another example, a particular device may be within a wireless range of three APs. The particular device may transmit a wireless signal. Each AP may receive the wireless signal at a respective signal strength. Based on the signal strength received by each AP, a device monitoring engine may determine a location of the particular device with respect to the three APs. The device monitoring engine may store the location as a device attribute of the particular device. Additional and/or alternative methods may be used in determining a location of a particular device, such as, using integrated Bluetooth radio.

The device monitoring engine 502 collects information regarding the behaviors of each device. As an example, a device monitoring engine may detect a probe request transmitted by a particular device. The device monitoring engine may detect an authentication request transmitted by the particular device. The device monitoring engine may determine a duration of time between the probe request and the authentication request. The device monitoring engine may store the duration of time between the probe request and the authentication request as a behavior of the particular device.

As another example, a device monitoring engine may detect a roaming request transmitted by a particular device. The device monitoring engine may determine a signal strength of a wireless signal, received by the particular device, at the time the roaming request is detected. The device monitoring engine may store the received signal strength, at the time a roaming request is detected, as a behavior of the particular device.

As another example, a configuration engine may transmit a command to steer a particular device from a first radio to a second radio. A device monitoring engine may detect the command transmitted by the configuration engine. The device monitoring engine may determine whether the particular device successfully associated with the second radio. The device monitoring engine may determine a duration of time needed to switch from associating from the first radio to the second radio. The device monitoring engine may store the information related to steering as behaviors of the particular device. The client device may exhibit different behaviors depending on the specific steering performed. For example, the client device may exhibit different behaviors for (a) steering from the 2.4 GHz band to the 5 GHz band, (b) steering from the 5 GHz band to the 2.4 GHz band, (c) steering within the 2.4 GHz band, (d) steering within the 5 GHz band, (e) steering within an upper band of the 5 GHz band, and/or other types of steering.

The device monitoring engine 502 stores the device attributes and behaviors of a particular device as a particular set of device data. The device monitoring engine 502 stores a set of device data for each monitored device. The sets of device data are referred to herein as a "raw dataset."

In an embodiment, the device monitoring engine 502 uses the raw dataset as a global dataset. In another embodiment, the device monitoring engine 502 inputs the raw dataset into an anomaly detection engine 510. The anomaly detection engine 510 divides the raw dataset into an included dataset and an excluded dataset. The included dataset is used as the global dataset. Further examples of operations for determining whether to include or exclude device data are described in the related U.S. patent application Ser. No. 15/428,404, filed Feb. 9, 2017, which is hereby incorporated by reference in its entirety.

3.A. Identifying Correlations Between Device Attributes and Behaviors Based on Analysis of a Global Dataset One or more embodiments include applying an unsupervised learning algorithm to the global dataset to obtain a set of clusters for all device types, each cluster indicating a correlation between a set of device attributes and a set of behaviors (Operation 604). An unsupervised machine learning algorithm 314b is applied to the global dataset to identify clusters within the global dataset.

As an example, a global dataset may include the following sets of device data:
 (a) Attributes: Channel 44, Wi-Fi Radio Type A—Behaviors: connection time 35 ms
 (b) Attributes: Channel 44, Wi-Fi Radio Type B—Behaviors: connection time 45 ms
 (c) Attributes: Channel 149, Wi-Fi Radio Type C—Behaviors: connection time 75 ms An unsupervised machine learning algorithm may be applied to the global dataset to identify clusters. Since device data including Channel 44 as an attribute is associated with a similar connection time, but device data not including Channel 44 as an attribute is associated with dissimilar connection, a particular cluster may be associated with the attribute Channel 44. The behavior associated with the particular cluster may be the average connection time of all device data within the particular cluster. The average connection time may be 40 ms. Hence, the particular cluster may be as follows: "Attributes: Channel 44—Behaviors: connection time 40 ms."

3.B. Identifying Correlations Between Device Attributes and Behaviors Based on Analysis of Device Type Datasets One or more embodiments include applying a classifier function to divide the global dataset into device type datasets (Operation 606). A classifier function 216 may be applied to the global dataset. The classifier function 216 is obtained through application of a supervised machine learning algorithm 214 to a labeled global dataset 202, as described above with reference to FIG. 2.

In an embodiment, the device attributes and/or behaviors associated with a set of device data, within the global dataset, are identified. Scaling may be applied to one or more device attributes and/or behaviors. The classifier function 216 specifies a weight corresponding to each scaled device attribute and/or behavior. A sum of the weighted device attributes and/or behaviors is computed. The classifier function 216 is further associated with mappings between ranges of the weighted sum and device types. If the weighted sum is within a particular range, then the set of device data is associated with the device type mapped to the particular range. Based on the weighted sum, the set of device data is classified into a particular device type dataset.

As an example, a particular set of device data, within a global dataset, may be: "Attributes: Channel 36 (at 40 MHz width), SNR 20 dB—Behaviors: roaming time 25 ms."

A classifier function may specify that the channel attribute is associated with a weight of 0.5, the SNR attribute is associated with a weight of 0.3, and the roaming time is associated with a weight of 0.2. A weighted sum may be computed by normalizing the channel, SNR, and roaming time values and multiplying them with the corresponding weights. The weighted sum may indicate that a device type associated with the particular set of device data is iPhone 7. The classifier function may classify the particular set of device data into a device type dataset associated with iPhone 7.

One or more embodiments include applying the unsupervised learning algorithm to each device type dataset to obtain a set of clusters for each device type, each cluster indicating a correlation between a set of device attributes and a set of behaviors (Operation 608). An unsupervised machine learning algorithm 314b is applied to each device type dataset to identify clusters within each device type dataset. Further descriptions regarding the application of an unsupervised machine learning algorithm are included above with reference to Operation 604. The unsupervised machine learning algorithm 314a and the unsupervised machine learning algorithm 314b may be the same as or different from each other.

3.C. Determining Expected Behaviors for a Target Device Based on the Global Dataset and the Device Type Datasets One or more embodiments include determining device attributes for a target device (Operation 610). A device monitoring engine 502 monitors device data corresponding to the target device. Further descriptions regarding monitoring device data are included above with reference to Operation 602. The device monitoring engine 502 monitoring device data corresponding to the target device may but is not necessarily the same as the device monitoring engine 502 performing Operation 602.

One or more embodiments include identifying clusters that share at least one device attribute with the target device (also referred to as "relevant clusters") (Operation 612). A profile builder 406 (and/or a cluster selection module 408 thereof) identifies the clusters obtained from Operation 604 and Operation 608. The profile builder 406 compares (a) device attributes associated with each cluster and (b) the device attributes of the target device. The profile builder 406 identifies clusters that share at least one device attribute with the target device as relevant clusters.

The device data, obtained by the device monitoring engine 502, may but does not necessarily include a device type of the target device. If the device data, obtained by the device monitoring engine 502, does not include the device type of the target device, then the profile builder 406 may optionally apply a classifier function 216 to the device data of the target device. The classifier function 216 determines a device type associated with the device data of the target device. If a particular device type of the target device is known, using the device monitoring engine 502 and/or the classifier function 216, then the profile builder 406 selects only clusters that are associated with the particular device type.

In an embodiment, the profile builder 406 identifies relevant clusters in at least two phases. In the first phase, the profile builder 406 selects cluster groups 320a-c that are relevant to the target device. As described above, a cluster group includes clusters obtained from the global dataset. Alternatively, a cluster group includes clusters obtained from a single device type dataset.

The profile builder 406 selects the cluster group obtained from the global dataset as a relevant cluster group. Additionally or alternatively, the profile builder 406 selects at least a subset of the cluster groups obtained from a device type dataset as relevant cluster groups. The selection of relevant cluster groups, from the cluster groups obtained from a device type dataset, is based on the attributes that are known for the target device. If the known attributes of the target device include the device type of the target device, then the profile builder 406 selects only one cluster group, from the cluster groups obtained from a device type dataset. The selected cluster group is the cluster group obtained from the device type dataset associated with the device type of the target device. Alternatively, if the known attributes of the target device does not include the device type of the target device, then the profile builder 406 attempts to select one or more cluster groups, from the cluster groups obtained from a device type dataset, based on other device attributes. As an example, a known attribute of a target device may include a manufacturer of the target device. The manufacturer of the target device may be Apple, Inc. Based on the manufacturer of the target device, a profile builder selects only the cluster groups associated with Apple-manufactured device types, such as iPhone 7, and iPhone 6. The profile builder does not select cluster groups associated with device types of other manufacturers, such as Samsung Galaxy S6, and LG V20.

In the second phase, the profile builder 406 analyzes each selected cluster group to identify clusters that share at least one device attribute with the target device. Clusters that share at least one device attribute with the target device are referred to as "relevant clusters." The profile builder 406 does not analyze any non-selected cluster groups for relevant clusters. The relevant clusters may include (a) clusters obtained from one or more device type datasets and/or (b) clusters obtained from the global dataset.

One or more embodiments include determining whether the relevant clusters are associated with any common behaviors (Operation 614). The profile builder 406 (and/or a merger module 412 thereof) compares the behaviors associated each relevant cluster to the behaviors associated other relevant clusters. The profile builder 406 identifies any relevant clusters that are associated with the same behavior.

As an example, a target device may be an iPhone 7 operating on channel 11. One relevant cluster may be: "Attributes: Channel 11—Behaviors: correctly steers to a radio determined by the intelligent client steering algorithm, using a specific steering method." Another relevant cluster may be: "Attributes: iPhone 7—Behaviors: does not correctly steer to a radio determined by the intelligent client steering algorithm, using a specific steering method." A profile builder may determine that the two relevant clusters are associated with the same behavior, that is, response to the intelligent client steering algorithm. The response to the intelligent client steering algorithm is a common behavior to multiple relevant clusters (even though the value for the behavior is different for the different clusters, one being "correctly steers" and the other being "does not correctly steer").

In one or more embodiments, for each behavior that is common to multiple relevant clusters, the profile builder 406 applies a merger algorithm to determine an expected value for the behavior for the target device (Operation 616). The profile builder 406 (and/or a merger module 412 thereof) determines a first value, for the common behavior, associated with one relevant cluster. The profile builder 406 determines a second value, for the common behavior, associated with another relevant cluster. The profile builder 406 computes a weighted average of the first value and the second value. The weighted average is an expected value, for the common behavior, for the target device. Further examples for applying a merger algorithm to determine an expected value, for a behavior, for a target device are described with reference to FIG. 7.

One or more embodiments include aggregating behaviors from the relevant clusters to obtain a profile for the target device (Operation 618). The profile builder 406 (and/or an aggregation module 410 thereof) compares the behaviors associated each relevant cluster to the behaviors associated other relevant clusters.

For behaviors that are common to multiple relevant clusters, the profile builder 406 determines an expected value, for the common behavior, as described above with reference to Operation 616. The profile builder 406 includes the expected value, for the common behavior, into the target device profile.

For behaviors that are unique to any single relevant cluster, the profile builder 406 identifies the value, for the behavior, as indicated by the relevant cluster. The profile builder 406 includes the value, for the behavior, into the target device profile.

As an example, a target device may be an iPhone 7 operating on channel 36 (at 40 MHz width). One relevant cluster may be: "Attributes: Channel 36 (at 40 MHz width)—Behaviors: correctly steers to a radio determined by the intelligent client steering algorithm, using a specific steering method." A profile builder may determine that the behavior, response to the steering algorithm, is not associated with any other relevant clusters.

Additionally, another relevant cluster may be: "Attributes: iPhone 7—Behaviors: connection time 35 ms." The profile builder may determine that the behavior, connection time, is not associated with any other relevant clusters.

The profile builder may aggregate behaviors for (a) the response to a steering algorithm and (b) the connection time into a target device profile. The target device profile may include the following expected behaviors for the target device: correctly steers to a radio determined by a steering algorithm; and connection time 35 ms.

Figure 7:
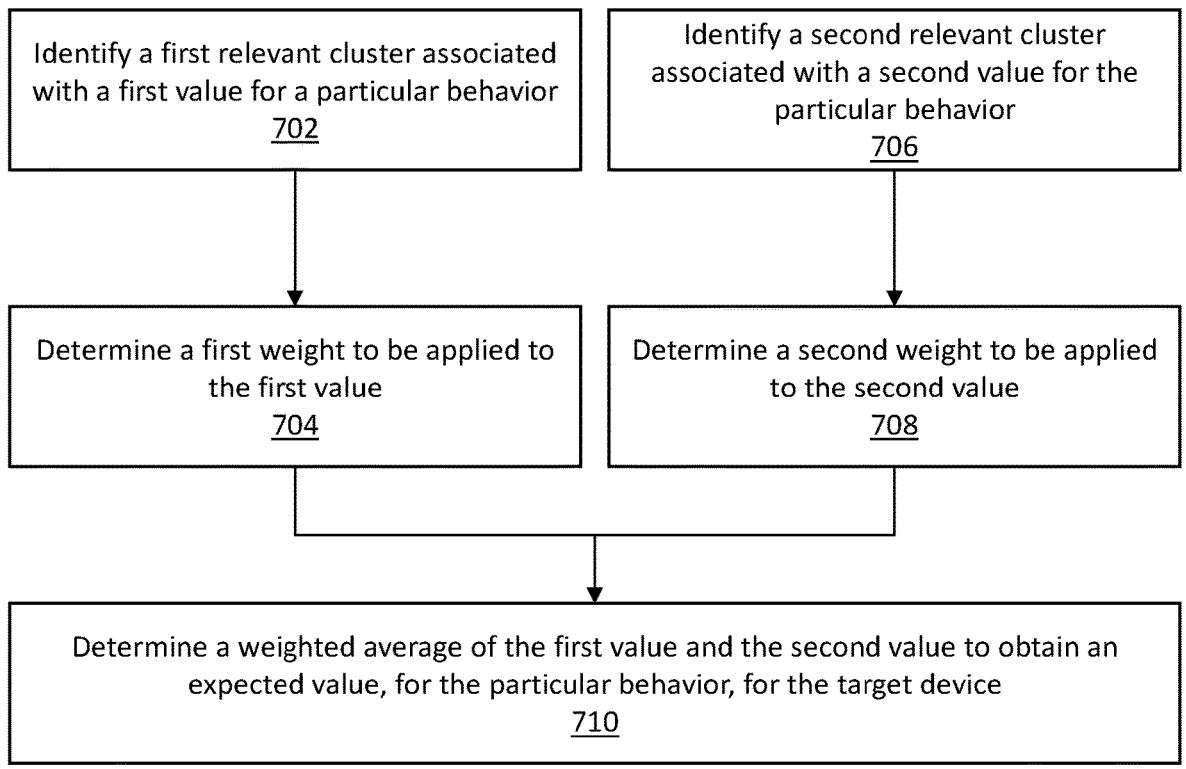
FIG. 7 illustrates an example set of operations for merging different values, for a particular behavior, to determine an expected value, for the particular behavior, for the target device, in accordance with one or more embodiments.

4. Merging Different Values, for a Particular Behavior, to Determine an Expected Value, for the Particular Behavior, for a Target Device FIG. 7 illustrates an example set of operations for merging different values, for a particular behavior, to determine an expected value, for the particular behavior, for the target device, in accordance with one or more embodiments. Operations described with reference to FIG. 7 may be incorporated into Operation 616 of FIG. 6. Additionally or alternatively, operations described with reference to FIG. 7 may be used in other ways to merge values, for a particular behavior, to determine an expected value, for the particular behavior, for the target device. One or more operations illustrated in FIG. 7 may be modified, rearranged, or omitted all together. Accordingly, the particular sequence of operations illustrated in FIG. 7 should not be construed as limiting the scope of one or more embodiments.

One or more embodiments include identifying a first relevant cluster associated with a first value for a particular behavior (Operation 702). A profile builder 406 (and/or a merger module 412 thereof) identifies the first relevant cluster. The first relevant cluster indicates a correlation between (a) a set of device attributes and (b) a set of behaviors. The first relevant cluster indicates a first value for a particular behavior, of the set of behaviors. As described above with reference to Operation 614, the particular behavior is associated with multiple relevant clusters (including the first relevant cluster).

As an example, a first cluster may indicate a correlation between (a) the attribute "iPhone 7" and (b) the behavior "connection time 30 ms." A second cluster may indicate a correlation between (a) the attribute "iPhone 7" and (b) the behavior "connection time 34 ms." A target device may be associated with the attribute "iPhone 7."

Since each of the first and second clusters share a device attribute with the target device, both the first and second clusters are relevant clusters for the target device. The first and second clusters are associated with the same behavior, "connection time." The first cluster indicates a value of "30 ms" for the behavior "connection time." The second cluster indicates a value of "34 ms" for the behavior "connection time."

One or more embodiments include determining a first weight to be applied to the first value (Operation 704). The first weight to be applied to first value may be referred to as being "associated with the first cluster." The profile builder 406 (and/or a merger module 412 thereof) determines the first weight based on one or more factors, such as:

(a) an attribute type of the attribute that is shared between the first relevant cluster and the target device;
(b) a behavior type of the common behavior shared across the relevant clusters;
(c) a number of device attributes that are shared between the first relevant cluster and the target device;
(d) a number of devices in the first relevant cluster;
(e) a particular time period in which the device data corresponding to the first relevant cluster was collected; and
(f) a correlation strength between the attributes and the behaviors associated with the first relevant cluster.

In an embodiment, the profile builder 406 determines a particular attribute type of the attribute that is shared between the first relevant cluster and the target device. A data repository stores a set of mappings between (a) weights and (b) attribute types. The profile builder 406 uses the set of mappings to determine the weight corresponding to the particular attribute type of the attribute shared between the first relevant cluster and the target device. The profile builder 406 determines that the weight, corresponding to the particular attribute type, is associated with the first relevant cluster.

The set of mappings between (a) weights and (b) attribute types may indicate that greater weights correspond to attribute types related to "locality," while lesser weights correspond to other attribute types. "Locality" refers to a geographical location, connection with a particular network, and/or association with a particular network device (such as, an AP, or a cellular tower). As an example, a device attribute of a device may be "connection with 'Conference Room Wi-Fi Network.'" A particular attribute type of the device type may be "connection with a particular network." Since the particular attribute type is related to "locality," a greater weight may correspond to the particular attribute type than to other attribute types.

As an example, a first cluster may indicate a correlation between (a) the attribute "connection with the network 'Mike's Office'" and (b) the behavior "connection time 40 ms." A second cluster may indicate a correlation between (a) the attribute "Channel 36 (at 40 MHz width)" and (b) the behavior "connection time 44 ms." A target device may be associated with the attributes "connection with the network 'Mike's Office'" and "Channel 36 (at 40 MHz width)." An attribute that is shared between the first cluster and the target device is "connection with the network 'Mike's Office.'" An attribute that is shared between the second cluster and the target device is "Channel 36 (at 40 MHz width)."

A profile builder may determine an attribute type of the attribute, "connection with the network 'Mike's Office.'" The attribute type may be "connection with a particular network." The profile builder may determine an attribute type of the attribute, "Channel 36 (at 40 MHz width)." The attribute type may be "operating channel." A set of mappings between weights and attributes may indicate a weight of 0.8 associated with the attribute type, "connection with a particular network." The set of mappings may indicate a weight of 0.2 associated with the attribute type, "operating channel."

In an embodiment, the profile builder 406 determines a particular behavior type of the common behavior shared across the relevant clusters. Based on the particular behavior type, different algorithms may be used for determining the weight associated with each relevant cluster.

A behavior type may be "behaviors for determining a threshold time period for generating a time-out error or action." For this behavior type, an algorithm for determining the weight associated with each relevant cluster may be as follows: (1) determine a maximum value, for the common behavior, indicated by the relevant clusters; and (2) determine that a weight of 1 is associated with the relevant cluster indicating the maximum value and that a weight of 0 is associated with the remaining relevant clusters. The algorithm ensures that the maximum value, for the common behavior, has passed before generating a time-out error or action.

As an example, a first relevant cluster may indicate a correlation between the attribute "iPhone 7" and the behavior "a time to complete association stage of 25 ms." A second relevant cluster may indicate a correlation between the attribute "iPhone 7" and the behavior "a time to complete association stage of 20 ms." A target device may be associated with the attribute "iPhone 7."

A common behavior associated with the first and second relevant clusters may be "time to complete association stage." A behavior type of the common behavior may be "behaviors for determining a threshold time period for generating a time-out error."

A profile builder may determine a maximum value, for the "time to complete association stage" behavior, indicated by the first and second relevant clusters. The profile builder may determine that the maximum value is "25 ms," as indicated by the first relevant cluster. The profile builder may determine that a weight of 1 is associated with the first relevant cluster, while a weight of 0 is associated with the second relevant cluster.

In an embodiment, the profile builder 406 determines a number of device attributes that are shared between the first relevant cluster and the target device. The number of shared device attributes may be directly proportional to the weight associated with the first relevant cluster.

As an example, a first relevant cluster may indicate a correlation between (a) the attributes "iPhone 7" and "Channel 36 (at 40 MHz width)" and (b) the behavior "connection time 37 ms." A second relevant cluster may indicate a correlation between (a) the attributes "iPhone 7" and "SNR of 20 dB" and the behavior "connection time 25 ms." A target device may be associated with the attributes "iPhone 7," "Channel 36 (at 40 MHz width)," and "SNR of 25 dB."

A profile builder may determine that a number of device attributes shared between the first relevant cluster and the target device is two (that is, "iPhone 7" and "Channel 36 (at 40 MHz width)"). The profile builder may determine that a number of device attributes shared between the second relevant cluster and the target device is one (that is, "iPhone 7"). The profile builder may determine that a greater weight is associated with the first cluster, and a lesser weight is associated with the second cluster.

In an embodiment, a profile builder 406 determines a number of devices in the first relevant cluster. The number of devices in the first relevant cluster may be directly proportional to the weight associated with the first relevant cluster.

As an example, a first relevant cluster may be obtained from a global dataset. The number of sets of device data, within the global dataset, that correspond to the first relevant cluster may be 1,000. A second relevant cluster may be obtained from a device type dataset. The number of sets of device data, within the device type dataset, that correspond to the second relevant cluster may be 1,200. A profile builder may determine that a greater weight is associated with the second cluster, and a lesser weight is associated with the first cluster.

In an embodiment, a profile builder 406 determines a particular time period in which the device data corresponding to the first relevant cluster was collected. The importance of the time period during which the device data, corresponding to the first relevant cluster, was collected may be directly proportional to the weight associated with the first relevant cluster. The importance of a particular time period may be determined based on how recent the particular time period is. Additionally or alternatively, the importance of a particular time period may be determined based on whether the particular time period coincides with normal business hours and/or an important event.

As an example, a first relevant cluster may be obtained from a global dataset. The average time corresponding to the sets of device data that correspond to the first relevant cluster may be today at 12:00 noon. A second relevant cluster may be obtained from a device type dataset. The average time corresponding to the sets of device data that correspond to the second relevant cluster may be 11:00 a.m.

A profile builder may determine that a particular time period in which the device data corresponding to the first relevant cluster was collected is more recent than a particular time period in which the device data corresponding to the second relevant was collected. The profile builder may determine that a greater weight is associated with the first cluster, and a lesser weight is associated with the second cluster.

As another example, a first relevant cluster may be obtained from a global dataset. The average time corresponding to the sets of device data that correspond to the first relevant cluster may be today at 10:00 am. A second relevant cluster may be obtained from a device type dataset. The average time corresponding to the sets of device data that correspond to the second relevant cluster may be 4:00 a.m.

A profile builder may determine that the device data corresponding to the first relevant cluster was collected during normal business hours (that is, 10:00 a.m.). The profile builder may determine that the device data corresponding to the second relevant cluster was not collected during normal business hours (that is, 4:00 a.m.). The profile builder may determine that a greater weight is associated with the first cluster, and a lesser weight is associated with the second cluster.

In an embodiment, the profile builder 406 determines a correlation strength between the attributes and the behaviors associated with the first relevant cluster. The correlation strength may be directly proportional to the weight associated with the first relevant cluster. The correlation strength may be determined based on various factors such as, a number of devices in the first relevant cluster, a spread of the device data in the first relevant cluster, and/or the number of devices in the dataset from which the first relevant cluster was obtained.

As an example, a first relevant cluster may indicate a correlation between the attribute "iPhone 7" and the behavior "connection time 30 ms." A second relevant cluster may indicate a correlation between the attribute "iPhone 7" and the behavior "connection time 38 ms." The correlation strength of the correlation indicated by the first relevant cluster may be greater than the correlation strength of the correlation indicated by the second relevant cluster. A profile builder may determine that a greater weight is associated with the first cluster, and a lesser weight is associated with the second cluster.

One or more embodiments include identifying a second relevant cluster associated with a second value for the particular behavior (Operation 706). Further descriptions relating to identifying a relevant cluster associated with a value for the particular behavior are included above with reference to Operation 702.

One or more embodiments include determining a second weight to be applied to the second value (Operation 708). Further descriptions relating to determining a weight associated with a relevant cluster are included above with reference to Operation 704. The same method, or different methods, may be used for determining (a) the first weight to be applied to the first value, and (b) the second weight to be applied to the second value.

One or more embodiments include determining a weighted average of the first value and the second value to obtain an expected value, for the particular behavior, for the target device (Operation 710). The profile builder 406 computes a dot product of (a) the respective values for the particular behavior, as indicated by the first and second relevant clusters, and (b) the respective weights, associated with the first and second relevant clusters. The profile builder 406 applies the first weight to the first value, which is associated with the first cluster. The profile builder 406 applies the second weight to the second value, which is associated with the second cluster. The profile builder 406 computes a sum of the products to obtain the weighted average. The profile builder 406 determines that the weighted average is the expected value, for the particular behavior, for the target device.

As an example, a first relevant cluster may indicate a correlation between the attribute "iPhone 7" and the behavior "connection time 40 ms." The first value for the behavior "connection time," as indicated by the first relevant cluster, may be 40 ms. A second relevant cluster may indicate a correlation between the attribute "iPhone 7" and the behavior "connection time 48 ms." The second value for the behavior "connection time," as indicated by the second relevant cluster, may be 48 ms.

Based on various factors, a profile builder may determine that a first weight associated with the first relevant cluster is 0.70. The profile builder may determine that a second weight associated with the second relevant cluster is 0.30.

The profile builder may apply the first weight to the first value to obtain a product of 28. The profile builder may apply the second weight to the second value to obtain a product of 14.4. The profile builder may compute a sum of the products to obtain a weighted average of 42.4. Hence, the expected connection time for the target device may be 42.4 ms.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

A communication network includes the following client devices: Device #01, Device #02, and Device #03. Device Data #01 corresponds to Device #01. Device Data #02 corresponds to Device #02. Device Data #03 corresponds to Device #03.

An unsupervised learning algorithm is applied to a global dataset including Device Data #01, Device Data #02, and Device Data #03. A cluster group, obtained from the global dataset, includes the following clusters:

(a) Attributes: SNR 25 dB, Network "Michael's Home"—Behaviors: connection time 36 ms; and
(b) Attributes: SNR 25 dB, Channel 36 (at 40 MHz width)—Behaviors: roaming time 45 ms, connection time 32 ms.

A classifier function is applied to the global dataset. The classifier function determines that Device Data #01 and Device Data #02 are associated with the device type, Apple iPhone 7. The classifier function determines that Device Data #03 is associated with the device type, Samsung Galaxy S6.

The unsupervised learning algorithm is applied to the device type dataset associated with iPhone 7, including Device Data #01, and Device Data #02. A cluster group, obtained from the iPhone 7 dataset, includes the following clusters:

(a) Attributes: iPhone 7, Channel 11—Behaviors: connection time 30 ms.

The unsupervised learning algorithm is applied to the device type dataset associated with Galaxy S6, including Device Data #03. A cluster group, obtained from the Galaxy S6 dataset, includes the following clusters:

(a) Attributes: Galaxy S6, Channel 11—Behaviors: enters power-save mode if not used for 1 minute.

A target device is associated with the following attributes: iPhone 7, and Channel 36 (at 40 MHz width). A profile builder identifies cluster groups relevant to the target device. The relevant cluster groups include: (a) the cluster group obtained from the global dataset, and (b) the cluster group obtained from the iPhone 7 dataset. The relevant cluster groups do not include the cluster group obtained from the Galaxy S6 dataset.

The profile builder analyzes the cluster group obtained from the global dataset for clusters sharing a device attribute with the target device. A first cluster, "Attributes: SNR 25 dB, Network 'Michael's Home'—Behaviors: connection time 36 ms," does not share any attributes with the target device. The first cluster is not selected. The second cluster, "Attributes: SNR 25 dB, Channel 36 (at 40 MHz width)—Behaviors: roaming time 45 ms, connection time 32 ms," shares an attribute with the target device. The second cluster is selected as a relevant cluster.

The profile builder analyzes the cluster group obtained from the iPhone 7 dataset for clusters sharing a device attribute with the target device. The cluster, "iPhone 7, Channel 36 (at 40 MHz width)—Behaviors: connection time 30 ms," shares an attribute with the target device. The cluster is selected as a relevant cluster.

The profile builder determines that the behavior "connection time" is shared between (a) the cluster "Attributes: SNR 25 dB, Channel 36 (at 40 MHz width)—Behaviors: roaming time 45 ms, connection time 32 ms," obtained from the global dataset, and (b) the cluster "iPhone 7, Channel 36 (at 40 MHz width)—Behaviors: connection time 30 ms," obtained from the iPhone 7 dataset. The profile builder applies a merger algorithm to the behavior "connection time" to determine an expected behavior for the target device.

The profile builder determines that the value indicated for the behavior "connection time," as indicated by the cluster "Attributes: SNR 25 dB, Channel 36 (at 40 MHz width)—Behaviors: roaming time 45 ms, connection time 32 ms," is 32 ms.

The profile builder determines a number of device attributes shared between (a) the cluster "Attributes: SNR 25 dB, Channel 36 (at 40 MHz width)—Behaviors: roaming time 45 ms, connection time 32 ms," and (b) the target device. The number of shared device attributes is one (that is, the attribute "Channel 36 (at 40 MHz width)"). The profile builder also determines a time period during which the device data, corresponding to the cluster, was collected. The profile builder determines that the device data was collected at an average of three days ago. Based on the number of shared device attributes and the time period during which the device data was collected, the profile builder determines that a weight associated with the cluster is 0.4. The profile builder applies the weight of 0.4 to the value of 32 to obtain a product of 12.8.

The profile builder determines that the value indicated for the behavior "connection time," as indicated by the cluster "iPhone 7, Channel 36 (at 40 MHz width)—Behaviors: connection time 30 ms," is 30 ms.

The profile builder determines a number of device attributes shared between (a) the cluster "iPhone 7, Channel 36 (at 40 MHz width)—Behaviors: connection time 30 ms," and (b) the target device. The number of shared device attributes is two (that is, the attributes "iPhone 7" and "Channel 36 (at 40 MHz width)"). The profile builder also determines a number of devices associated with the cluster. The profile builder determines that 1,000 devices are associated with the cluster. Based on the number of shared device attributes and the number of devices associated with the cluster, the profile builder determines that a weight associated with the cluster is 0.6. The profile builder applies the weight of 0.6 to the value of 30 to obtain a product of 18.

The profile builder computes a sum of the two products to obtain a weighted average of 1.08. Expressed as a formula, the weighted average is 0.4×32+0.6×30=30.8. Hence, the profile builder determines that an expected connection time of the target device is 30.8 ms.

The profile builder aggregates the behaviors, from the relevant clusters, into a target device profile. The aggregated behaviors include "roaming time" and "connection time."

The profile builder obtains the expected roaming time for the target device from the cluster "Attributes: SNR 25 dB, Channel 36 (at 40 MHz width)—Behaviors: roaming time 45 ms, connection time 32 ms." The expected roaming time is 45 ms.

The profile builder obtains the expected connection time for the target device based on the merging of (a) the cluster "Attributes: SNR 25 dB, Channel 36 (at 40 MHz width)—Behaviors: roaming time 45 ms, connection time 32 ms," and (b) the cluster "iPhone 7, Channel 36 (at 40 MHz width)—Behaviors: connection time 30 ms." As described above, the expected connection time is 30.8 ms.

Hence, the target device profile includes the expected behaviors, "roaming time 45 ms" and "connection time 30.8 ms."

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    identifying a global dataset associated with a set of devices of a plurality of device types;
    applying an unsupervised learning algorithm in a first process to obtain a first plurality of clusters, the first process comprising:
        inputting the global dataset into the unsupervised learning algorithm to determine the first plurality of clusters within the global dataset, wherein the first plurality of clusters comprises a first cluster indicating a first correlation between (i) a first device attribute and (ii) a first value for a first behavior;
    applying the unsupervised learning algorithm in a second process to obtain a second plurality of clusters, the second process comprising:
        dividing the global dataset into at least a first dataset and a second dataset using a classifier function, wherein:
            the first dataset is associated with a first device type of the plurality of device types; and
            the second dataset is associated with a second device type of the plurality of device types;
        inputting the first dataset, without inputting at least the second dataset, into the unsupervised learning algorithm to determine the second plurality of clusters within the first dataset, wherein the second plurality of clusters comprises a second cluster indicating a second correlation between (i) the first device attribute and (ii) a second value for a second behavior;
    determining that a target device is associated with the first device type and the first device attribute;
    obtaining a profile for the target device at least by:
        aggregating, into the profile, (i) the first value for the first behavior associated with the first cluster of the first plurality of clusters obtained from the first process and (ii) the second value for the second behavior associated with the second cluster of the second plurality of clusters obtained from the second process.

2. The medium of claim 1, wherein:
    the target device is further associated with a second device attribute;
    the first plurality of clusters further comprises a third cluster indicating a third correlation between (i) the second device attribute and (ii) a third value for a third behavior;
    the operations further comprise: based on the third cluster, storing the third value for the third behavior in the profile for the target device.

3. The medium of claim 1, wherein:
    the target device is further associated with a second device attribute;
    the second plurality of clusters further comprises a third cluster indicating a third correlation between (i) the second device attribute and (ii) a third value for a third behavior;
    the operations further comprise: based on the third cluster, storing the third value for the third behavior in the profile for the target device.

4. The medium of claim 1, wherein the first behavior comprises at least one of:
    a protocol behavior;
    a connection behavior;
    a power-save behavior;
    a roaming behavior;
    a response to a particular configuration algorithm; and
    a response to a particular radio-frequency environment.

5. The medium of claim 1, wherein the operations further comprise:
    determining that a second target device is associated with the second device type and the first device attribute;
    based on the first cluster, storing the first value for the first behavior in the profile for the second target device;
    applying the unsupervised learning algorithm to the second dataset to determine a third plurality of clusters, wherein the third plurality of clusters comprises a third cluster indicating a third correlation between (i) the first device attribute and (ii) a third value for a third behavior;

based on the third cluster, storing the third value for the third behavior in the profile for the second target device.

6. The medium of claim 1, wherein the unsupervised learning algorithm comprises a cluster analysis.

7. The medium of claim 1, wherein the classifier function is determined using a supervised learning algorithm.

8. The medium of claim 1, wherein:
the target device is further associated with a second device attribute;
the first plurality of clusters comprises a third cluster indicating a third correlation between (i) the second device attribute and (ii) a third value for a third behavior;
the second plurality of clusters comprises a fourth cluster indicating a fourth correlation between (i) the second device attribute and (ii) a fourth value for the third behavior;
the operations further comprise:
determining a first weight for the third value based on at least one of:
an attribute type of the second device attribute; and
a behavior type of the third behavior;
determining a second weight for the fourth value based on at least one of:
an attribute type of the second device attribute; and
a behavior type of the third behavior;
computing a weighted average of the third value and the fourth value based on the first weight and the second weight, respectively;
determining that the weighted average is an expected value, for the third behavior, for the target device;
based on the third cluster and the fourth cluster, storing the expected value for the third behavior in the profile for the target device.

9. A system, comprising:
at least one device including a hardware processor; and
the system configured to perform operations comprising:
identifying a global dataset associated with a set of devices of a plurality of device types;
applying an unsupervised learning algorithm in a first process to obtain a first plurality of clusters, the first process comprising:
inputting the global dataset into the unsupervised learning algorithm to determine the first plurality of clusters within the global dataset, wherein the first plurality of clusters comprises a first cluster indicating a first correlation between (i) a first device attribute and (ii) a first value for a first behavior;
applying the unsupervised learning algorithm in a second process to obtain a second plurality of clusters, the second process comprising:
dividing the global dataset into at least a first dataset and a second dataset using a classifier function, wherein:
the first dataset is associated with a first device type of the plurality of device types; and
the second dataset is associated with a second device type of the plurality of device types;
inputting the first dataset, without inputting at least the second dataset, into the unsupervised learning algorithm to determine the second plurality of clusters within the first dataset, wherein the second plurality of clusters comprises a second cluster indicating a second correlation between (i) the first device attribute and (ii) a second value for a second behavior;
determining that a target device is associated with the first device type and the first device attribute;
obtaining a profile for the target device at least by:
aggregating, into the profile, (i) the first value for the first behavior associated with the first cluster of the first plurality of clusters obtained from the first process and (ii) the second value for the second behavior associated with the second cluster of the second plurality of clusters obtained from the second process.

10. The system of claim 9, wherein:
the target device is further associated with a second device attribute;
the first plurality of clusters further comprises a third cluster indicating a third correlation between (i) the second device attribute and (ii) a third value for a third behavior;
the operations further comprise: based on the third cluster, storing the third value for the third behavior in the profile for the target device.

11. The system of claim 9, wherein the first behavior comprises at least one of:
a protocol behavior;
a connection behavior;
a power-save behavior;
a roaming behavior;
a response to a particular configuration algorithm; and
a response to a particular radio-frequency environment.

12. A method, comprising:
identifying a global dataset associated with a set of devices of a plurality of device types;
applying an unsupervised learning algorithm in a first process to obtain a first plurality of clusters, the first process comprising:
inputting the global dataset into the unsupervised learning algorithm to determine the first plurality of clusters within the global dataset, wherein the first plurality of clusters comprises a first cluster indicating a first correlation between (i) a first device attribute and (ii) a first value for a first behavior;
applying the unsupervised learning algorithm in a second process to obtain a second plurality of clusters, the second process comprising:
dividing the global dataset into at least a first dataset and a second dataset using a classifier function, wherein:
the first dataset is associated with a first device type of the plurality of device types; and
the second dataset is associated with a second device type of the plurality of device types;
inputting the first dataset, without inputting at least the second dataset, into the unsupervised learning algorithm to determine the second plurality of clusters within the first dataset, wherein the second plurality of clusters comprises a second cluster indicating a second correlation between (i) the first device attribute and (ii) a second value for a second behavior;
determining that a target device is associated with the first device type and the first device attribute;
obtaining a profile for the target device at least by:
aggregating, into the profile, (i) the first value for the first behavior associated with the first cluster of the first plurality of clusters obtained from the first process and (ii) the second value for the second behavior associated with the second cluster of the second plurality of clusters obtained from the second process;
wherein the method is performed by at least one device including a hardware processor.

13. A non-transitory computer readable medium comprising instructions which, when executed by one or more hardware processors, cause performance of operations comprising:
- identifying a first plurality of devices that share a first set of one or more device attributes with a target device;
- determining a first value for a particular behavior associated with the first plurality of devices;
- determining a first weight for the first value based on at least one of:
  - a first attribute type of a first device attribute of the first set of device attributes; and
  - a behavior type of the particular behavior;
- identifying a second plurality of devices that share a second set of one or more device attributes with the target device;
- determining a second value for the particular behavior associated with the second plurality of devices;
- determining a second weight for the second value based on at least one of:
  - a second attribute type of a second device attribute of the second set of device attributes; and
  - the behavior type of the particular behavior;
- computing a weighted average of the first value and the second value based on the first weight and the second weight, respectively;
- determining that the weighted average is an expected value, for the particular behavior, for the target device.

14. The medium of claim 13, wherein the first weight is determined further based on at least one of:
- a first number of device attributes in the first set of device attributes;
- a number of devices in the first plurality of devices;
- a particular time period in which device data for the first plurality of devices was collected; and
- a correlation strength between the first set of device attribute and the first value for the particular behavior.

15. The medium of claim 14, wherein the first weight is directly proportional to how recent the particular time period is.

16. The medium of claim 13, wherein determining a weighted average of the first value and the second value comprises:
- determining that the first value is larger than the second value;
- applying a first weight of one to the first value to obtain a first product;
- applying a second weight of zero to the second value to obtain a second product;
- computing a sum of the first product and the second product as the weighted average.

17. The medium of claim 13, wherein determining the first weight for the first value comprises:
- selecting an algorithm, from a plurality of algorithms, for determining the first weight based on at least one of:
  - a first attribute type of a first device attribute of the first set of device attributes; and
  - a behavior type of the particular behavior.

18. The medium of claim 13, wherein identifying the first plurality of devices that share the first set of device attributes with the target device comprises:
- identifying device data for a group of devices in a communication network;
- applying an unsupervised machine learning algorithm to the device data for the group of devices to identify a plurality of clusters;
- identifying a cluster, of the plurality of clusters, indicating a correlation between (a) at least the first set of device attributes and (b) at least the first value for the particular behavior;
- identifying a subset of the group of devices, that are associated with the cluster, as the first plurality of devices.

19. The medium of claim 13, wherein identifying the first plurality of devices that share the first set of device attributes with the target device comprises:
- identifying a global dataset comprising device data for a group of devices in a communication network;
- dividing the global dataset into at least a first device type dataset and a second device type dataset using a classifier function;
- applying an unsupervised machine learning algorithm to the first device type dataset to identify a plurality of clusters;
- identifying a cluster, of the plurality of clusters, indicating a correlation between (a) at least the first set of device attributes and (b) at least the first value for the particular behavior;
- identifying a subset of the group of devices, that are associated with the cluster, as the first plurality of devices.

20. The medium of claim 13, wherein the first set of device attributes comprises a particular device type.

* * * * *